United States Patent [19]
Lee et al.

[11] Patent Number: 5,245,661
[45] Date of Patent: Sep. 14, 1993

[54] DISTRIBUTED SAMPLE SCRAMBLING SYSTEM

[75] Inventors: Byeong Gi Lee, Apt. Na-200 Bong Cheon 7 dong Kwanakku; Seok Chang Kim, 302, 384-32 Habjeongdong Mapoku, both of Seoul, Rep. of Korea

[73] Assignees: Byeong Gi Lee; Seok Chang Kim; Goldstar Information & Communications Ltd., Seoul, Rep. of Korea

[21] Appl. No.: 887,686

[22] Filed: May 22, 1992

[30] Foreign Application Priority Data

Apr. 21, 1992 [KR] Rep. of Korea .................. 1992-6704

[51] Int. Cl.$^5$ .............................................. H04L 9/00
[52] U.S. Cl. ........................................ 380/50; 380/46; 380/48
[58] Field of Search .......................... 380/50, 46, 48; 364/717; 375/113, 114, 115, 116; 370/105, 107

[56] References Cited

U.S. PATENT DOCUMENTS

| | | | |
|---|---|---|---|
| 3,784,743 | 1/1974 | Schroeder | 380/50 |
| 4,176,247 | 11/1979 | Englund | 380/50 |
| 4,636,583 | 1/1987 | Bidell et al. | 380/50 |
| 4,736,424 | 4/1988 | Busby | 380/50 |
| 4,771,463 | 9/1988 | Beeman | 380/50 |
| 5,023,887 | 6/1991 | Takeuchi et al. | 380/50 |
| 5,148,485 | 9/1992 | Dent | 380/50 |

OTHER PUBLICATIONS

Report: Parallel Scrambling Techniques for Digital Multiplexlers, AT&T Technical Journal, Author Doo-Whan Choi, 123-136.

"Modification of PRBS Source Bits in Distributed Sample Scrambler"—CCITT 1989-1992—Melbourne, 2-13, Dec. 1991.

"Self Synchronising Scrambler $x^{43}+1$" CCITT SG XVIII—Melbourne, 2-13, Dec. 1991.

*Primary Examiner*—David Cain
*Attorney, Agent, or Firm*—Darby & Darby

[57] ABSTRACT

A distributed sample scrambling system comprising scrambler and a descrambler. The scrambler includes a first shift register generator (SRG) 2 for generating scrambler SRG sequence, an exclusive OR gate 7 for generating a scrambled bitstream by adding the binary sequence to a scrambler input bitstream, and first sampling unit 2 for sampling the scrambler SRG sequence at non-uniform sampling intervals. The descrambler includes a second shift register generator 5 for generating descrambler SRG sequence, second sampling unit 4 for sampling the descrambler SRG sequence at the same sampling times, a comparator 3 for comparing the samples of descrambler SRG sequence to the samples of scrambler SRG sequence in order to determine whether said samples of both the descrambler and the scrambler are identical, a correction circuitry 6 for outputting correction signals corresponding to the comparison results of the comparator 3 to the second shift register generator 5, and an exclusive OR gate 8 for generating a descrambled bitstream by adding the descrambler SRG sequence to the scrambled bitstream of the scrambler.

8 Claims, 4 Drawing Sheets

SRG SEQUENCE ($S_K$)

Fig. 6

| HEC + St | HEC + St+1 | HEC 6 | HEC 5 | HEC 4 | HEC 3 | HEC 2 | HEC 1 |

DISTRIBUTED SAMPLE SCRAMBLING SYSTEM

BACKGROUND OF THE INVENTION

1. Field of the Invention

The present invention relates in general to a system for scrambling and descrambling distributed samples, and more particularly to a distributed sample scrambling system which generates samples of both scrambler and descrambler shift register generator sequences at sampling times of non-uniform intervals in order to scramble and descramble the scrambler input bitstream.

2. Description of the Prior Art

Conventionally. FSS (Frame Synchronous Scrambling) system and SSS (Self Synchronous Scrambling) system are known as a binary data scrambling and descrambling system. The SSS system has, however, a drawback of error multiplication effect, which is very critical in cell-based transmission, while it satisfies the required randomizing effect of data. Also, the FSS system has a disadvantage in that it can not satisfy the randomizing effect of data in case the frame size is not large enough even though such an error multiplication effect does not occur therein.

In an effort to solve the above problems occurring in both the FSS system and the SSS system, a distributed sample scrambling system (hereinafter, referred to simply as "the DSS system") was recently adopted for use in the cell-based physical layer of BISDN (Broadband Integrated Services Digital Network) by CCITT (International Telegraph and Telephone Consultative Committee), as described in CCITT Temporary Document 22, Appendix 2 to Annex 4, "Changes for the Distributed Sample Scrambler", June 1991.

The known DSS system is basically similar to the FSS system which scrambles and descrambles the digital bitstreams by adding the shift register generator (hereinafter, referred to simply as "the SRG") sequences to them. But in order to increase the randomizing effect of data, the DSS system is different from the FSS system in the method of synchronizing the state of the descramble SRG to that of the scrambler SRG. That is, in the DSS system the samples of the scrambler SRG sequence, which SRG sequence represents information on the scrambler SRG state, are generated, then transmitted to the descrambler, and the descrambler SRG state is corrected using the samples of the scrambler SRG sequence to become identical to the scrambler SRG state, while in the FSS system the SRGs in both the scrambler and the descrambler are synchronized by resetting the states of both SRGs to a prespecified state at the start of each frame.

In the DSS system of CCITT comprising a scrambler and a descrambler, the scrambler scrambles the scrambler input bitstream by adding the scrambler SRG sequence thereto, thereby generating a scrambled bitstream. Additionally, in the scrambler, samples of the scrambler SRG sequence are picked up at sampling times of uniform interval, then transmitted to the descrambler in parallel with the scrambled bitstream. On the other hand, receiving the scrambled bitstream and the samples of the scrambler SRG sequence, the descrambler corrects using the samples of the scrambler SRG sequence the descrambler SRG state to be identical to the scrambler SRG state. Thereafter, in the descrambler the transmitted scrambled bitstream is descrambled by adding the descrambler SRG sequence thereto, thereby obtaining descrambled bitstream. This descrambled bitstream is then identified to the original input bitstream of the scrambler by the descrambler. In result, the scrambled original bitstream can be descrambled by the descrambler.

However, the known DSS system only uses samples corresponding to sampling times of uniform interval, thus it is obliged to have a disadvantage in that it should have a complex construction resulting from a clock, storage and a complex correction circuitry, which are adapted to pick up and store such samples, furthermore, it has another disadvantage in that it can not use samples which are picked up at sampling times of non-uniform intervals.

SUMMARY OF THE INVENTION

It is, therefore, an object of the present invention to provide a distributed sample scrambling system which performs the scrambling and descrambling function of the distributed samples along with having a substantially simple construction.

It is another object of the present invention to provide a distributed sample scrambling system which picks up the samples at sampling times of non-uniform intervals or picks up a plurality of samples contiguously.

In order to accomplish the above objects, the present invention provides a distributed sample scrambling system comprising scrambler and a descrambler, characterized in that the scrambler includes: a first shift register generator for generating binary sequence for scrambling distributed samples, said first generator comprising a plurality of shift registers; output means for generating a scrambled bitstream by adding said binary sequence to a scrambler input bitstream, then outputting said scrambled bitstream to the descrambler; and first sampling means for sampling said binary sequence of the first shift register generator at non-uniform sampling time intervals so as to generate samples of scrambler binary sequence, then outputting said samples to the descrambler; and the descrambler includes: a second shift register generator for generating binary sequence for descrambling, said second generator comprising a plurality of shift registers; second sampling means for sampling said binary sequence of the second shift register generator at the same sampling times as those of the first sampling means so as to generate samples of descrambler binary sequence, then outputting said samples; comparison means for comparing said samples of descrambler binary sequence to said samples of scrambler binary sequence in order to determine whether said samples of both the descrambler and the scrambler are identical to each other; correction means for outputting correction signals corresponding to the comparison results of said comparison means to said second shift register generator; and descrambled bitstream generating means for generating a descrambled bitstream by adding the binary sequence of said second shift register generator to said scrambled bitstream outputted from said output means of the scrambler.

BRIEF DESCRIPTION OF THE DRAWINGS

The above and other objects, features and other advantages of the present invention will be more clearly understood from the following detailed description taken in conjunction with the accompanying drawings, in which:

FIG. 6 is a diagram showing the data structure of header error control field in case of contiguous mode in accordance with the present invention.

DETAILED DESCRIPTION OF THE PREFERRED EMBODIMENTS

Figure 1:
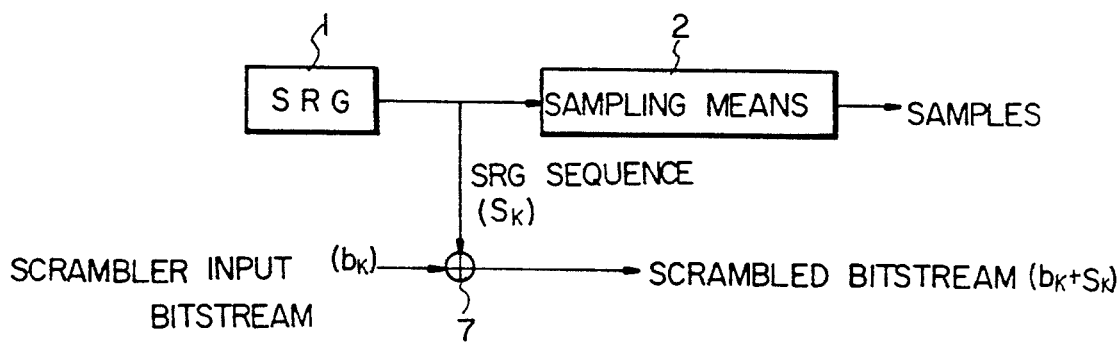
FIG. 1 is a block diagram showing construction of a distributed sample scrambling (DSS) system according to the present invention.
Figure 1:
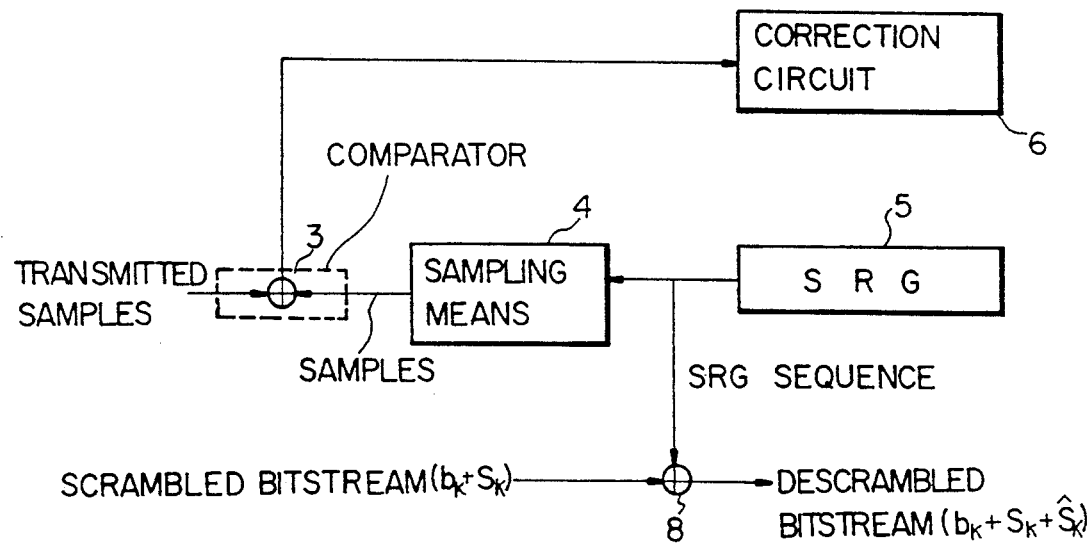

With reference to FIG. 1 showing construction of a DSS system (Distributed Sample Scrambling system) in accordance with the present invention, the DSS system comprises scrambler and descrambler, each having a SRG (shift register generator) 1, 5, sampling means 2, 4 and an exclusive OR gate 7, 8. In addition, the descrambler further includes a comparator 3 and a correction circuit 6.

The scrambler, comprising the scrambler SRG 1, the first sampling means 2 and the exclusive OR gate 7, scrambles a scrambler input bitstream $B_k$ by adding (hereinafter, all additions are modulo-2 operations) scrambler SRG sequence $S_k$ to the bitstream $B_k$. In the scrambler the first sampling means 2 generates samples of the scrambler SRG sequence $S_k$, then transmits the samples to the descrambler. In this case, the samples are transmitted to the descrambler in parallel with the scrambled bitstream $B_k+S_k$. Receiving the samples of scrambler SRG sequence, the descrambler is synchronized to the scrambler, that is, the descrambler SRG state is corrected using the samples of scrambler SRG sequence $S_k$ to be identical to the scrambler SRG state.

Here, the scrambler sampling means 2 has to pick up the samples of the scrambler SRG sequence $S_k$ at non-uniform sampling time intervals or has to pick up a plurality of samples contiguously. The scrambler sampling means 2 thus comprises an AND gate which uses the clock signals and the scrambler SRG sequence $S_k$ as its input signals.

On the other hand, the number of samples of scrambler SRG sequence is same as that of the shift registers in the scrambler SRG 1. In addition, the samples of the scrambler SRG sequence may be transmitted to the descrambler through a common path through which the scrambled bitstream $B_k+S_k$ is also transmitted to the descrambler, or may be transmitted through another path instead of the above common path.

Receiving the samples of the scrambler SRG sequence, the descrambler first makes the state of descrambler SRG 5, which descrambler SRG 5 has the same structure as that of the scrambler SRG 1, to be identical to that of the scrambler SRG 1 by using the samples, then descrambles the original input bitstream $B_k$ by adding the descrambler SRG sequence $\wedge S_k$ to the scrambled bitstream $B_k+S_k$. At this time, in case both SRG states in the scrambler and the descrambler are not identical to each other, that is, the SRG sequences $S_k$ and $\wedge S_k$ are not identical to each other, the descrambler can not descramble the original input bitstream $B_k$.

The descrambler SRG state can be corrected using the samples of scrambler SRG sequence to be identical to the scrambler SRG state in the following manner:

Receiving the samples of scrambler SRG sequence and the scrambled bitstream, the descrambler first samples the descrambler SRG sequence $\wedge S_k$ in the same manner as that of the scrambler so that it generates its own samples of descrambler SRG state, then compares its own samples to the samples of the scrambler SRG sequence one by one. The comparison function is carried out by the comparator 3. If the comparator 3 determines that the two samples of both SRGs 1 and 5 are not identical to each other, the correction logic is initiated to change the descrambler SRG state at a correction time. In the above manner, all of the samples of the descrambler SRG state are sequentially compared to the samples of the scrambler SRG sequence, and the descrambler SRG state is corrected to be identical to the scrambler SRG state. As a result, the descrambler is synchronized to the scrambler, that is, the descrambler SRG state is identified to the scrambler SRG state.

In this DSS system, the compartor 3 of the descrambler performs the comparison function to compare the samples of the scrambler SRG sequence to the samples of the descrambler SRG state, as described above. In accordance with an embodiment of a DSS system of this invention, the DSS system is provided with a comparator 3 comprising a plurality of supply line, through which correction signals are supplied, and a plurality of exclusive OR gates.

On the other hand, the correction circuit 6 is adapted to perform the correction logic to correct the descrambler SRG state when the comparator 3 determines that the two samples of both SRG states are not identical.

The SRG states of both the scrambler and the descrambler are identified using the above-mentioned synchronizing method to each other in accordance with the following basic definitions:

First, let the length N of the SRG be defined as the number of shift registers in the SRG, the state vector $d_k$ as a vector representing the state of shift registers in the SRG at time k, the state transition matrix T as a matrix representing the relation of the state vectors $d_k$ and $d_{k+1}$, and the generating vector h as a vector representing the relation between the scrambler SRG sequence $S_k$ and the state vector $d_k$, respectively. Then, the state vector $d_k$, $d_{k+1}$ and $S_k$ will be described by the following expressions:

$$d_k = [d_{0,k}\, d_{1,k} \ldots d_{N-1,k}]^t,$$

$$d_{k+1} = T \cdot d_k,$$

and $$S_k = h^t \cdot d_k.$$

In the expressions, $d_{i,k}$, $i=0, 1, \ldots N-1$, denotes the value of the ith shift register in SRG at time k, and the superscript "t" means transpose.

For example, for the SRG shown in FIG. 2, the length N, the state transition matrix T and the generating vector h are thus defined as follows:

$$N = 4,$$

-continued $$T = \begin{bmatrix} 0 & 1 & 0 & 0 \\ 0 & 0 & 1 & 0 \\ 0 & 0 & 0 & 1 \\ 1 & 1 & 0 & 0 \end{bmatrix}$$

$$h = [0\ 0\ 1\ 1]^t$$

In addition, If $r+\alpha_i$, $i=0, 1, \ldots, N-1$, is defined as the sampling time of the ith sample of the SRG sequence of both the scrambler and the descrambler, the transmitted sample of the scrambler SRG sequence will be described as $S_{r+\alpha i}$ and the sample of the descrambler SRG sequence will be described as $\wedge S_{r+\alpha i}$. Here, r is insignificant reference time which is assumed to be identical in both the scrambler and the descrambler.

Also, For the synchronization of the descrambler, the state of the descrambler SRG is repeatedly corrected until the descrambler SRG sequence $\wedge S_r$ becomes identical to the scrambler SRG sequence $S_r$. For each correction, the transmitted sample $S_{r+\alpha i}$ of the scrambler SRG sequence is compared to the sample $\wedge S_{r+\alpha i}$ of the descrambler SRG sequence, and a correction is made on the state of the descrambler SRG at time $r+\beta_i$, $i=0, 1, \ldots, N-1$, which is the correction time using the ith sample, in case the two samples are not identical.

Also, let the time $\beta_i$, $i=0, 1, \ldots, N-1$, be defined as the correction time. Then, the correction time $\beta_i$ is later than the sampling time $\alpha_i$ but no later than another sampling time $\alpha_{i+1}$. The position of each shift register in the descrambler SRG, which register is corrected at each correction time, is represented as a vector. Here, let the vector be defined as the correction vector $c_i$, $i=0, 1, \ldots, N-1$.

Figure 3:
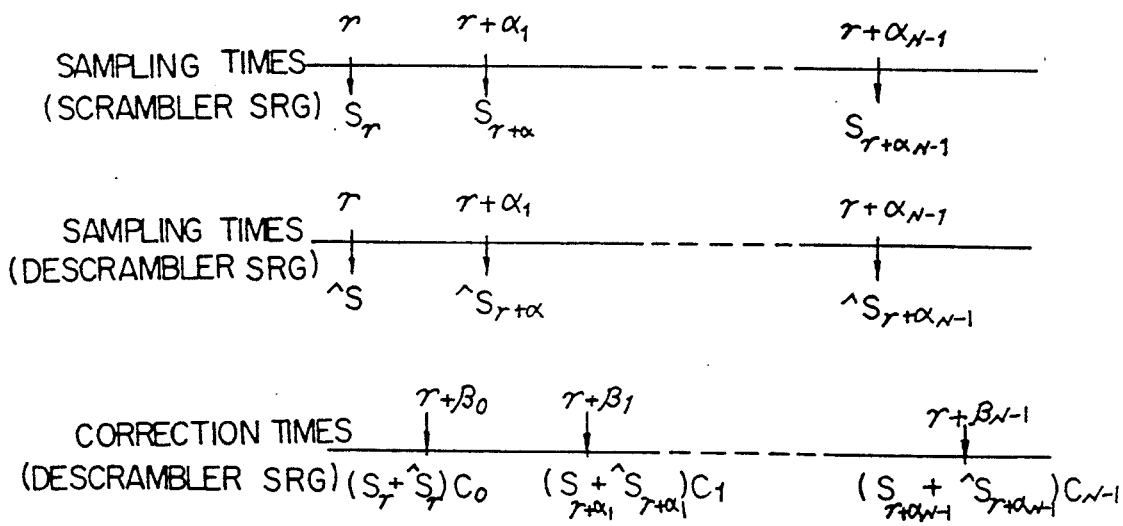
FIG. 3 is a timing diagram of sampling times and correction times.

Then, the synchronization process of the DSS system of this invention can be described as shown in FIG. 3. As shown in the drawing, the two samples $S_{r+\alpha i}$ and $S_{r+\alpha i}$ of both the descrambler SRG sequence and the descrambler SRG sequence are taken at the sampling time $r+\alpha_i$, and compared to each other. If it is determined that the two samples $S_{r+\alpha i}$ and $\wedge S_{r+\alpha i}$ are not identical, the correction process for the descrambler SRG state is carried out, as described above. That is, at the correction time $r+\beta_i$, the two samples $S_{r+\alpha i}$ and $\wedge S_{r+\alpha i}$ are added to each other, then the sum of the above addition is multiplied by the correction vector $c_i$, that is, $(S_{r+\alpha i} + S_{r+\alpha i})c_i$. In result, the descrambler SRG state is corrected to be identical to the scrambler SRG state.

In addition, if the state error vector $e_k$ is defined as $d_k + \wedge d_k$ representing the difference between the scrambler state vector $d_k$ and the descrambler state vector $d_k$, the relation between the finally corrected state vector $e_{r+\beta(N-1)}$ and the initial state error vector $e_r$ turns out to be $$e_{r+\beta(N-1)} = \Lambda \cdot e_r,$$

where $\Lambda$ is an $N \times N$ correction matrix which has the following expression, $$\Lambda = (T^{\beta N-1-\beta N-2} + c_{N-1} \cdot h^t \cdot T^{\alpha N-1-\beta N-2}) \cdot \quad (1)$$

$$(T^{\beta N-2-\beta N-3} + c_{N-2} \cdot h^t \cdot T^{\alpha N-2-\beta N-3}) \cdot$$

$$(T^{\beta 1-\beta 0} + c_1 \cdot h^t \cdot T^{\alpha 1-\beta 0}) \cdot (T^{\beta 0} + c_0 \cdot h^t).$$

Therefore, the synchronization problem in the DSS system can be restated as a problem of identifying the sampling time $\alpha_i$, the correction time $\beta_i$ and the correction vector $c_i$ to make the matrix $\Lambda$ in (1) a zero matrix.

The following theorems provide fundamental guidelines in selecting the sampling time $\alpha_i$, the correction time $\beta_i$ and the correction vector $c_i$ to make the matrix $\Lambda$ a zero matrix, respectively.

Theorem 1 (sampling time selection)

Let the discrimination matrix $\Delta$ be defined as follows:

$$\Delta = \begin{bmatrix} h^t \\ h^t \cdot T^{\alpha 1} \\ h^t \cdot T^{\alpha 2} \\ \ldots \\ h^t \cdot T^{\alpha(N-1)} \end{bmatrix} \quad (2)$$

Then the sampling time $\alpha_i$ must be chosen such that the discrimination matrix $\Delta$ in (2) becomes nonsingular, in order for the correction time $\beta_i$ and the correction vector $c_i$ that make the correction matrix $\Lambda$ in (1) a zero matrix to exist.

Theorem 2 (correction time and vector selection)

If the sampling time $\alpha_i$ is chosen such that the discrimination matrix $\Delta$ in (2) becomes nonsingular, the correction time $\beta_i$ for making the correction matrix $\Lambda$ in (1) a zero matrix may be orbitarily chosen and the correction vector $c_i$ must be chosen, for the correction time $\beta_i$, to meet the following expression $$c_i = \begin{cases} T^{\beta 1} \cdot \Delta^{-1} \cdot \left( a_1 + \sum_{j=i+1}^{N-1} u_{ij} \cdot a_j \right), \\ \qquad\qquad\qquad\qquad i = 0, 1, \ldots, N-2, \\ T^{\beta N-1} \cdot \Delta^{-1} \cdot a_{N-1}, \qquad i = N-1, \end{cases} \quad (3)$$

wherein $u_{ij}$ is either 0 or 1 for $i=0, 1, \ldots, N-2$ and $j=i+1, i+2, \ldots, N-1$; and N-vector $a_j$, $i=0, 1, \ldots, N-1$, is the basis vector whose ith element is 1 and the others are 0.

Figure 2:
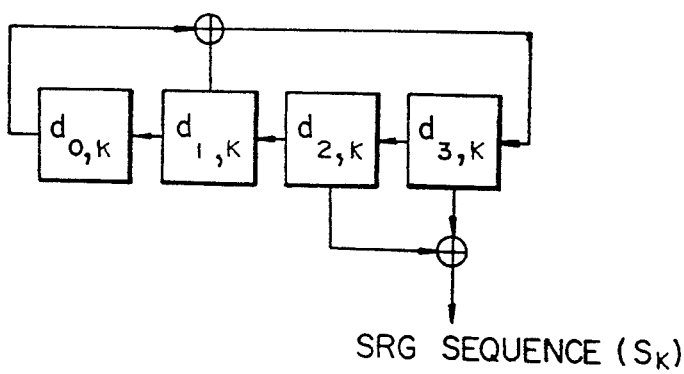
FIG. 2 is a block diagram showing a structure of a shift register generator (SRG) which can be employed in the DSS system of the present invention.

For example, if it is considered that the SRG in FIG. 2 is employed in the DSS system of this invention and also the sampling times $\alpha_1=1$, $\alpha_2=5$ and $\alpha_3=6$ are chosen, the discrimination matrix $\Delta$ in (2) becomes nonsingular.

Therefore, if we select the correction times $\beta_0=1$, $\beta_1=2$, $\beta_2=6$ and $\beta_3=7$, the following correction vectors $c_i$s are obtained according to (3): $c_3=(0010)^t$; $c_2=(0010)^t$, or $(0011)^t$; $c_1=(0010)^t$, - - -, or $(1101)^t$; $c_0=(0010)^t$, - - -, or $(1011)^t$.

The selection guidelines determined by these two theorems are general criteria that can be applied to all non-uniformly sampled DSS, with the contiguously sampled case being its special example.

Figure 4:
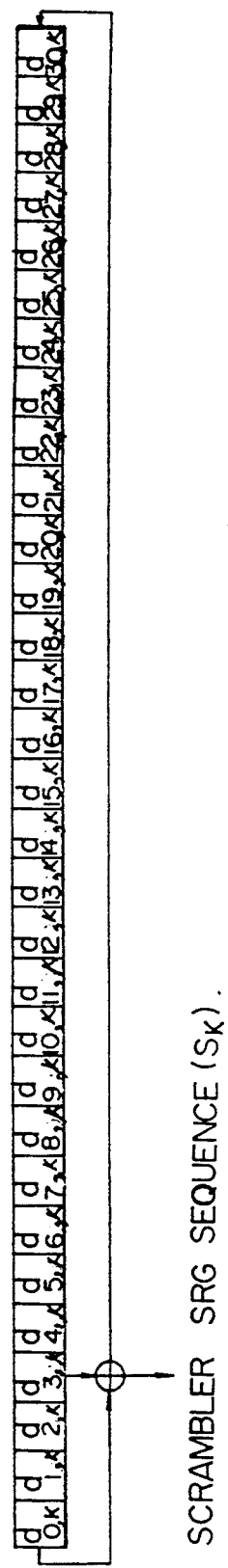
FIG. 4 is a diagram showing a structure of an embodiment of a SRG in the DSS system of FIG. 1.

Here, let the results derived in the previous paragraphs be applied to the DSS system for ATM(Asynchronous Transfer Mode) cell scrambling, and each SRG of the DSS system be assumed to have the same structure as that of the SRG shown in FIG. 4.

And also, let, as a special example, the two contiguous samples of the scrambler SRG sequence be added to the high order contiguous 2 bit-positions of HEC (Header Error Control) field. At this time, if contiguous sampling times are chosen such that $\alpha_1=1$, $\alpha_2=424\times 1$, $a_3=424\times1+1$, $a_4=424\times2$, ..., $a_{29}=424\times14+1$, $a_{30}=424\times15$, the discrimination matrix $\Delta$ in (2) becomes nonsingular.

In accordance, if contiguous correction times are chosen in the similar manner such that $\beta_0=1$, $\beta_1=2$, $\beta_2=424\times1+1$, $\beta_3=424\times1+2$, ..., $\beta_{29}=424\times14+2$, $\beta_{30}=424\times15+1$, the following two sets of correction vectors are obtained by the expression (3), $$c_0 = c_2 = \ldots$$
$$= c_{30} = [100101000000011100100110011011]^t,$$

and $$c_1 = c_3 = \ldots$$
$$= c_{29} = [111001001001100111001000000001]^t.$$

Figure 5:
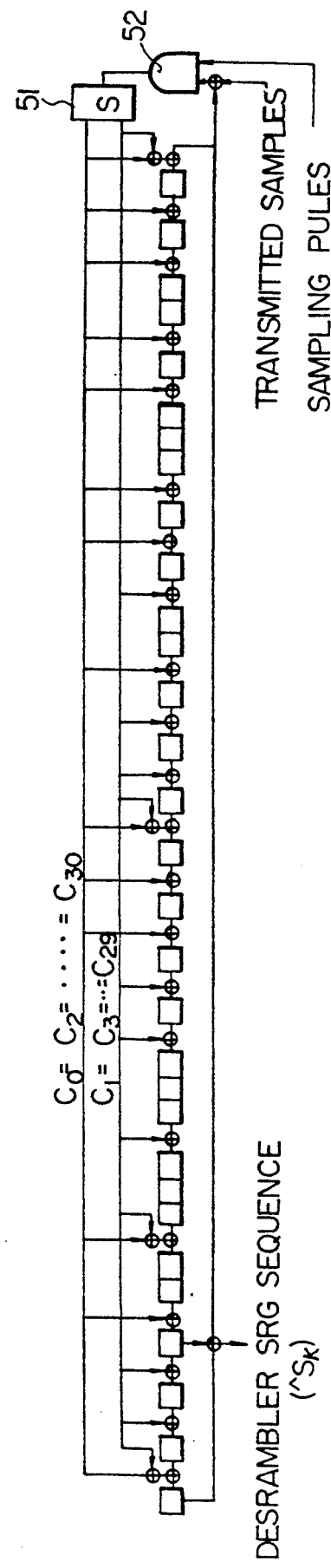
FIG. 5 is a diagram showing structure of an embodiment of a descrambler of the DSS system of FIG. 1.

The descrambler resulting from this contiguous mode of operation has the configuration shown in FIG. 5.

In FIG. 5, the reference numeral 51 denotes a select switch, 52 denotes an END gate, the tetragons denote the shift registers and the circled+marks denote the exclusive OR gates.

Figure 6:
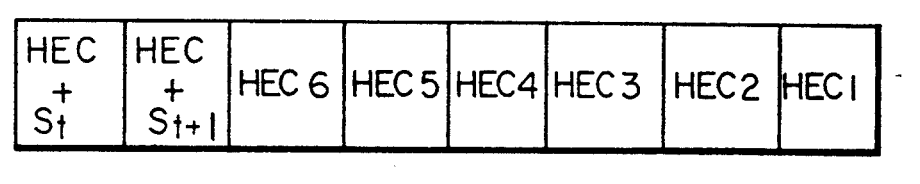

Also, in case data structure of HEC field is defined as contiguous mode as depicted in FIG. 6, the contiguous samples $S_t$ and $S_{t+1}$ of the scrambler SRG sequence are added to the high order contiguous 2 bit-positions of the HEC field, and are transmitted to the descrambler, respectively. In this case, the time t is the time when the $HEC_8$ is obtained.

As described above, the present invention provides a distributed sample scrambling (DSS) system comprising a substantially simple circuitry. Also, this DSS system generates samples of SRG sequences of both scrambler and descrambler at non-uniform sampling time intervals, it is thus applied more wide than the conventional sample scrambling system.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A distributed sample scrambling system comprising scrambler and a descrambler, characterized in that the scrambler includes:
    a first shift register generator means for generating binary sequence for scrambling distributed samples, said first generator means comprising a plurality of shift registers;
    output means for generating a scrambled bitstream by adding said binary sequence to a scrambler input bitstream, then outputting said scrambled bitstream to the descrambler; and
    first sampling means for sampling said binary sequence of the first shaft register generator means at non-uniform sampling time intervals so as to generate samples of scrambler binary sequence, then outputting said samples to the descrambler; and the descrambler includes:
    a second shift register generator means for generating binary sequence for descrambling, said second generator means comprising a plurality of shift registers;
    second sampling means for sampling said binary sequence of the second shift register generator means at the same sampling times as those of the first sampling means so as to generate samples of descrambler binary sequence, then outputting said samples;
    comparison means for comparing said samples of descrambler binary sequence to said samples of scrambler binary sequence in order to determine whether said samples of both the descrambler and the scrambler are identical to each other;
    correction means for outputting correction signals corresponding to the comparison results of said comparison means to said second shift register generator; and
    descrambled bitstream generating means for generating a descrambled bitstream by adding the binary sequence of said second shift register generator means to said scrambled bitstream outputted from said output means of the scrambler.

2. A distributed sample scrambling system according to claim 1, wherein said samples generated by the first sampling means of the scrambler are transmitted to said comparison means of the descrambler through a common path through which said scrambled bitstream is also transmitted.

3. A distributed sample scrambling system according to claim 1, wherein said first sampling means comprises an AND gate for generating samples at non-uniform sampling time intervals.

4. A distributed sample scrambling system according to claim 1, wherein said first sampling means comprises an AND gate for generating a plurality of samples contiguously.

5. A distributed sample scrambling system according to claim 3 or 4, wherein said correction means includes a plurality of supply lines and a plurality of exclusive OR gates, said supply line being adapted to allow said correction signals to be supplied therethrough.

6. A distributed sample scrambling system according to claim 1, wherein said output means of the scrambler and said descrambled bitstream generating means of the descrambler include exclusive OR gates, respectively.

7. A distributed sample scrambling system according to claim 6, wherein when said input bitstream of the scrambler includes header error control field, contiguous samples of the scrambler binary sequence are added to the contiguous 2 bit-positions of the header error control field, and are transmitted to said descrambler.

8. A distributed sample scrambling system according to claim 7, wherein said comparison means includes an exclusive OR gate.

* * * * *